US009742193B2

(12) United States Patent
Jain et al.

(10) Patent No.: US 9,742,193 B2
(45) Date of Patent: Aug. 22, 2017

(54) SYSTEM WHICH INTELLIGENTLY AND OPTIMALLY CONTROLS POWER UTILIZATION FROM HYBRID ENERGY SOURCES

(71) Applicant: Mahindra EPC Services Pvt. Ltd., Mumbai (IN)

(72) Inventors: Apurav Jain, Maharashtra (IN); Basant Jain, Mumbai (IN); Suhas Sutar, Maharashtra (IN); Prejith Edayankara Kadankottu, Kerala (IN)

(73) Assignee: MAHINDRA EPC SERVICES PVT. LTD., Mumbai (IN)

(*) Notice: Subject to any disclaimer, the term of this patent is extended or adjusted under 35 U.S.C. 154(b) by 305 days.

(21) Appl. No.: 14/684,610

(22) Filed: Apr. 13, 2015

(65) Prior Publication Data

US 2015/0380941 A1    Dec. 31, 2015

(30) Foreign Application Priority Data

Jun. 30, 2014 (IN) .......................... 2122/MUM/2014

(51) Int. Cl.
*H02J 7/00* (2006.01)
*H02J 9/00* (2006.01)
*H02J 3/38* (2006.01)
*H02J 3/32* (2006.01)

(52) U.S. Cl.
CPC ................ *H02J 3/382* (2013.01); *H02J 3/32* (2013.01); *Y02E 70/30* (2013.01)

(58) Field of Classification Search
USPC ...................................... 307/64, 66
See application file for complete search history.

(56) References Cited

U.S. PATENT DOCUMENTS

| 7,778,940 | B2 | 8/2010 | Mazzarella |
| 8,648,495 | B2 | 2/2014 | Chou et al. |
| 8,774,979 | B2 | 7/2014 | Yano et al. |
| 9,270,201 | B1* | 2/2016 | Potharaju ............... H02M 1/143 |
| 2005/0109387 | A1* | 5/2005 | Marshall ................. H02S 10/30 |
| | | | 136/253 |

(Continued)

FOREIGN PATENT DOCUMENTS

| AU | 2013201284 A1 | 9/2014 |
| CN | 101673963 A | 3/2010 |

(Continued)

*Primary Examiner* — Adam Houston
(74) *Attorney, Agent, or Firm* — Westman, Champlin & Koehler, P.A.

(57) ABSTRACT

A system for controlling power utilization from hybrid energy sources to reduce energy consumption costs and maximize use of renewable energy; the system comprises a plurality of switches for switching power between a plurality of power sources; a control unit for controlling the switches to switch between the power sources to supply power from at least one of said power sources to said loads; the control unit preventing back-feeding of power between the power sources; the control unit reducing excess power generated from multiple inverters equally or storing it in a battery bank; the control unit diverting the excess power to the battery bank in the event that loading of at least one of said power sources falls below a predetermined value.

9 Claims, 4 Drawing Sheets

(56) References Cited

U.S. PATENT DOCUMENTS

| | | | | |
|---|---|---|---|---|
| 2011/0101784 A1* | 5/2011 | Lopez | ............. | H02J 1/10 307/80 |
| 2011/0137482 A1* | 6/2011 | Toba | ............. | H02J 3/46 700/291 |
| 2013/0118550 A1* | 5/2013 | Sahin | ............. | H01L 31/042 136/246 |
| 2013/0190938 A1 | 7/2013 | Zadeh et al. | | |
| 2014/0119085 A1* | 5/2014 | Potharaju | ............. | H02M 7/5387 363/132 |
| 2014/0119086 A1* | 5/2014 | Potharaju | ............. | H02M 7/5387 363/132 |
| 2014/0153303 A1* | 6/2014 | Potharaju | ............. | H02M 7/06 363/126 |
| 2015/0380941 A1* | 12/2015 | Jain | ............. | H02J 3/382 307/22 |
| 2016/0094034 A1* | 3/2016 | Divan | ............. | H02J 3/18 307/11 |
| 2016/0211658 A1* | 7/2016 | Cruz | ............. | H01R 13/622 |
| 2016/0329718 A1* | 11/2016 | Sawyers | ............. | H02M 3/00 |

FOREIGN PATENT DOCUMENTS

| | | | |
|---|---|---|---|
| CN | 102035255 A | 4/2011 | |
| CN | 102064562 A | 5/2011 | |
| CN | 102280935 A | 12/2011 | |
| CN | 202645872 U | 1/2013 | |
| CN | 103470451 A | 12/2013 | |
| WO | 2013/132292 A1 | 9/2013 | |

* cited by examiner

SYSTEM WHICH INTELLIGENTLY AND OPTIMALLY CONTROLS POWER UTILIZATION FROM HYBRID ENERGY SOURCES

CROSS-REFERENCE TO RELATED APPLICATION

This Application is a non-provisional Application of Indian Application No. 2122/MUM/2014, filed Jun. 30, 2014, in English, the contents of which are hereby incorporated by reference in their entirety.

FIELD OF DISCLOSURE

The present disclosure relates to the field of power utilization.

DEFINITIONS

'Levelized Cost of Energy (LCOE)' is a metric used by the industry to calculate the cost of producing electricity.

'Hybrid' is a metric used by the industry to define a combination of different types of energy sources (renewable and non-renewable) that are used to generate electricity.

BACKGROUND

With increasing industrialization and demand for additional power, users are opting for hybrid energy alternatives including renewable sources of energy. One such renewable source of energy is solar power. Electricity is generated by photovoltaic cells when the cells are exposed to sunlight. Due to their dependence on irradiation, the production of electricity using solar panels is periodic and fluctuating hence needs to be supplemented with additional sources. Controlling the power optimally utilized by these different sources of energy is a problem faced by the industry. Most of the traditional methods used to overcome this drawback require human intervention, but still result in wastage of any excess energy produced in the system. Another problem faced by the implementation of traditional methods includes the back feed of power to the traditional power sources such as the grid and the generators. Rather than reducing costs, back feed adds to the electricity bill. Also another problem faced is with load balancing in single phase load supplied by multiple three phase sources.

Hence there is a requirement for a system which would overcome the above mentioned drawbacks.

OBJECTS

Some of the objects of the system of the present disclosure, which at least one embodiment herein satisfies, are as follows:

It is an object of the present disclosure to ameliorate one or more problems of the prior art or to at least provide a useful alternative.

An object of the present disclosure is to provide a system which intelligently and optimally controls power utilization from hybrid energy sources which maximizes the use of a renewable source of energy.

Another object of the present disclosure is to provide a system which intelligently and optimally controls power utilization from hybrid energy sources which reduces energy consumption costs.

A further object of the present disclosure is to provide a system which intelligently and optimally controls power utilization from hybrid energy sources which requires no human intervention.

A further object of the present disclosure is to provide a system which intelligently and optimally controls power utilization from hybrid energy sources which prevents back feed of power to the diesel generator and also prevents back feed power to the grid if required.

Another object of the present disclosure is to provide a system which intelligently and optimally controls power utilization from hybrid energy sources which is comparatively less expensive to install and implement.

Another object of the present disclosure is to provide a system with several operational modes on the basis of priority and availability of different sources of energy and their generation capacity.

Yet another object of the present disclosure is to provide a system which intelligently and optimally controls power utilization from hybrid energy sources which is vendor agnostic.

A further object of the present disclosure is to provide a system which intelligently and optimally controls power utilization from hybrid energy sources and can bring the diesel contribution to the load down until 0%.

Another object of the present disclosure is to provide a system which intelligently and optimally controls power utilization from hybrid energy sources which is applicable to a single phase and three phase power supply.

Yet another object of the present disclosure is to provide a system which intelligently and optimally controls power utilization from hybrid energy sources which can be remotely monitored.

Yet another object of the present disclosure is to provide a system which intelligently and optimally controls power utilization from hybrid energy sources also allows for multiple diesel generators synchronization to have optimal fuel consumption.

Yet another object of the present disclosure is to provide a system which intelligently and optimally controls power utilization from hybrid energy sources that facilitates balanced phase wise loading of various energy sources Yet another object of the present disclosure is to provide a system which intelligently and optimally controls power utilization from hybrid energy sources that is independent of the capacity of energy sources connected.

Other objects and advantages of the present disclosure will be more apparent from the following description when read in conjunction with the accompanying figures, which are not intended to limit the scope of the present disclosure.

SUMMARY

In accordance with an aspect of the present disclosure, there is provided a system for controlling power utilization from hybrid energy sources, the system comprising:
a plurality of switches for switching power supply between a plurality of power sources, the power sources being selected from the group consisting of at least one solar panel, at least one diesel generator and a power grid;
a control unit cooperating with the switches the power sources and a plurality of loads, the control unit adapted to selectively activate/deactivate the switches to switch between the power sources for supplying power from at least one of said power sources to the loads, wherein the activation/deactivation of each switch is based on a levelized cost of energy (LCOE), the available power from each power source and loading of at least one of the power sources; the control unit further adapted to prevent backfeeding of power between the power sources; and an inverter cooperating with the solar panel and said control unit, the inverter adapted to supply power from the solar panel to the loads, the control unit further adapted to control the amount of power being transferred from the inverter to the loads.

Typically, the control unit comprises at least one processing device adapted to calculate the LCOE, a modem adapted to enable the control unit to communicate with an external device, a terminal block having a plurality of conductors to connect the control unit to the multiple switches, at least one RS485 to USB converter adapted for signal conversion, a USB hub adapted to function as a communication port for the control unit, at least one miniature circuit breaker (MCB) adapted to prevent overloading of current in the control unit, a switch mode power supply (SMPS) adapted to provide power to the control unit, a tray adapted to accommodate electric cables associated with the control unit, a fan for cooling the control unit and a panel for mounting the control unit thereon.

Alternately, the diesel generator includes at least one low capacity diesel generator; the control unit adapted to activate at least one switch to supply power from the low capacity diesel generator to the loads, in the event that loading of the diesel generator falls below a predetermined value.

Additionally, the system further comprises a battery bank cooperating with the control unit, the battery bank adapted to store excess power generated by at least one of the power sources; the control unit further adapted to divert the excess power to the battery bank in the event that loading of at least one of the power sources falls below a predetermined value.

Additionally, the inverter is adapted to communicate the amount of solar power generated by the solar panel to the control unit.

Additionally, the system further comprises a distribution panel cooperating with the power sources and the control unit, the distribution panel adapted to distribute power from the power sources to the loads.

Additionally, the system further comprises an AC/DC converter cooperating with the battery bank and the control unit, the AC/DC converter adapted to convert power supplied from the battery bank to the loads.

Additionally, the system further comprises a bidirectional inverter cooperating with the battery bank to control the flow of excess power from the power sources to the battery bank.

In accordance with another aspect of the present disclosure, there is provided a method for controlling power utilization from hybrid energy sources comprising at least one solar panel, at least one diesel generator and a power grid, the method comprising the following steps:

checking the availability of the power grid; including:
selecting the power grid as the power source if the power grid is available; or
selecting the diesel generator as the power source if the power grid is unavailable;
determining whether loading of the power source is above/below a predetermined value; including:
determining whether loading of the power source is above/below a set percentage value if the power source is the diesel generator; including:
checking whether a lower capacity diesel generator is available if the loading of the diesel generator is below the set value; and
switching to the lower capacity diesel generator if available; or determining whether loading of the power source is above/below zero percent if the power source is the power grid;
checking whether a battery bank is available for storing excess power, if the lower capacity diesel generator is not available or the loading of the power grid is below zero percent; including:
charging the battery bank by diverting excess power to the battery bank, if the battery bank is available; or
reducing excess power transferred from at least one inverter, if the battery bank is not available; and
continuing normal operation if loading of the diesel generator is above the set percentage value or loading of the power grid is above zero percent.

BRIEF DESCRIPTION OF ACCOMPANYING DRAWINGS

A system which intelligently and optimally controls power utilization from hybrid energy sources of the present disclosure will now be described with the help of accompanying drawings, in which.

DETAILED DESCRIPTION OF ACCOMPANYING DRAWINGS

Figure 1:
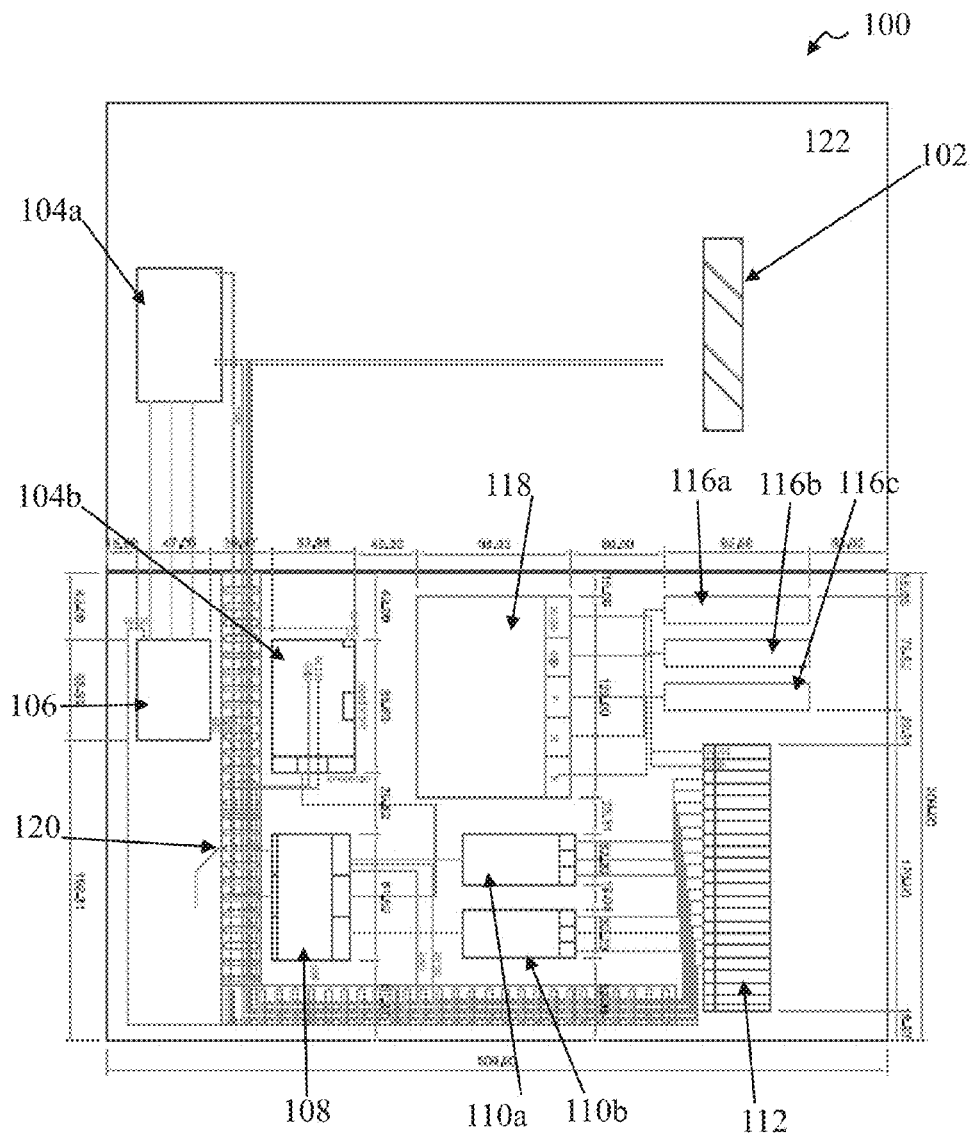
FIG. 1 illustrates an arrangement of different elements that constitute a control unit in accordance with one embodiment of the present disclosure.

A preferred embodiment of a system which intelligently and optimally controls power utilization from hybrid energy sources of the present disclosure will now be described in detail with reference to the accompanying drawings. The preferred embodiments do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Some of the drawbacks associated with the traditional methods to control the flow of power from different energy sources include reliance on human intervention to monitor and control the power utilization for different power sources for a hybrid supply and wastage of power when the system generates excess power. The traditional method causes back feeding of excess power to the diesel generator that trips the system and affects the life of the diesel generator. The traditional methods also back feed power to the electricity grid, when net-metering is unavailable, thereby adding to the electricity bill. Furthermore, the traditional methods, lack compatibility with different makes and models of inverters and diesel generators and lack of applications towards single phase loads. Additionally, in the traditional methods, the diesel to solar ratio is 5:1. The presently available solutions are vendor specific. These drawbacks are overcome with the system introduced in the present disclosure.

One of the primary objects of the system introduced in the present disclosure includes reducing electricity consumption costs by placing higher priority on energy obtained using solar panels. The system provided in the present disclosure is a standalone system which can be adjusted to any system capacity.

With reference to the accompanying diagrams, an Advanced Control Unit (ACU) of a system to intelligently control power utilization from hybrid energy sources as represented in FIG. 1 is denoted with the reference numeral 100. The ACU 100 primarily includes a fan 102, two Microcontrollers 104a and 104b, a modem 106, a USB hub 108, two RS485 to USB converters 110a and 110b, a terminal block 112, three Miniature Circuit Breakers (MCB) 116a, 116b and 116c, a Switched-Mode Power Supply (SMPS) 118 and a tray 120 mounted on a panel 122. The fan 102 is used to cool the electronic equipment mounted on the panel 122. Microcontrollers 104a and 104b are the processors of the ACU 100. A modem 106 used as a communication device primarily including at least one of Wi-Fi and LAN based communication channels. The USB hub 108 acts as a communication port for the ACU 100. Two RS485 to USB converters 110a and 110b adapted for signal conversion. The terminal block 112 is a set of connection points adapted to connect wires of the ACU 100. MCBs 116a, 116b and 116c used as circuit breakers to avoid overload of electric current in the ACU 100. SMPS 118 is used to provide current to the ACU 100. The tray 120 is used to carry the electricity cables of the ACU 100.

Figure 2A:
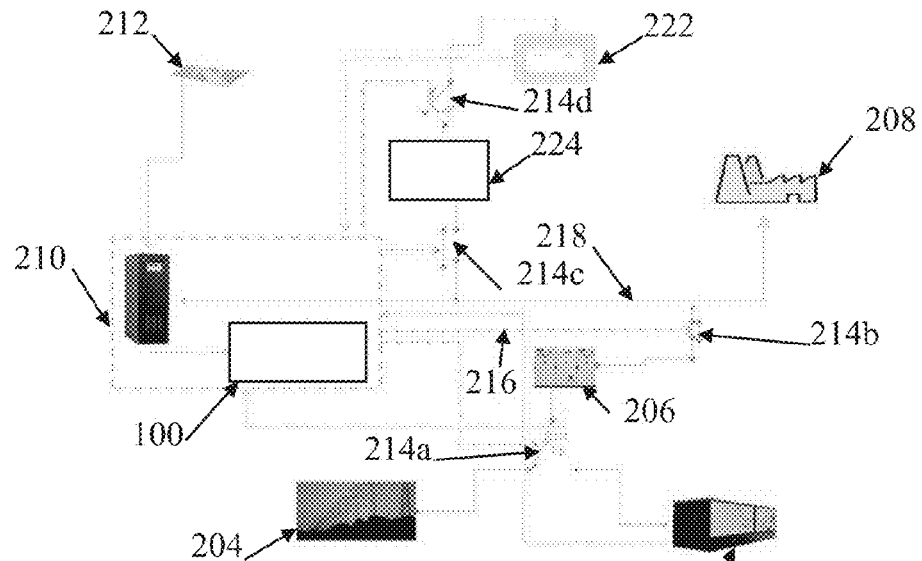
FIG. 2a illustrates an application of the control unit of FIG. 1 wherein the power generated by a diesel generator supplements the power generated by solar panels with a battery bank connected to the system in accordance with a first embodiment of the present disclosure.
Figure 2B:
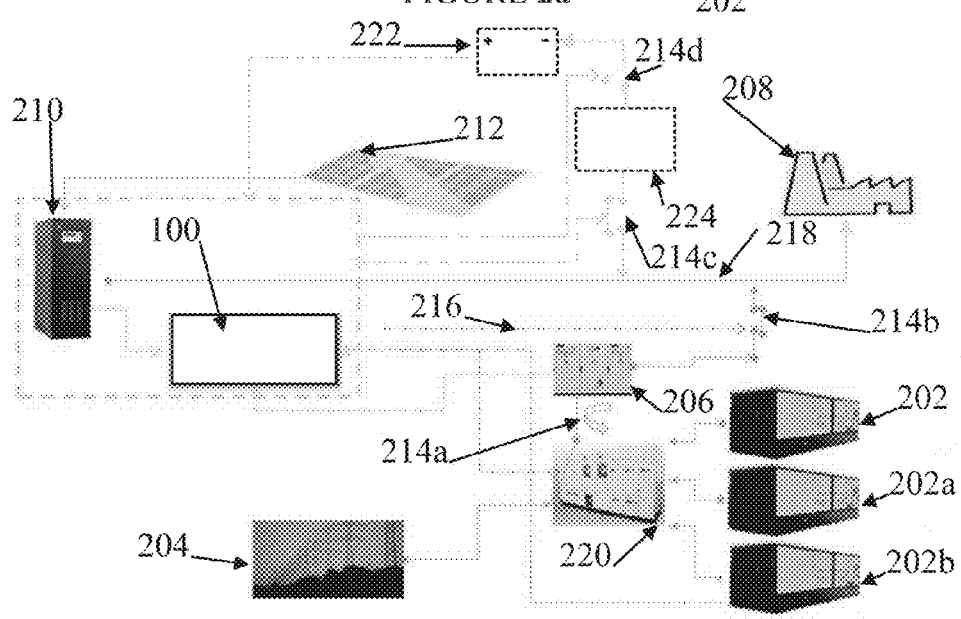
FIG. 2b illustrates an application of the control unit of FIG. 1 wherein the power generated by multiple diesel generators supplements the power generated by solar panels with an optional battery bank connected to the system in accordance with a second embodiment of the present disclosure.

FIG. 2a illustrates an application of the control unit 100 wherein the power generated by a diesel generator 202 supplements the power generated by solar panels 212 with a battery bank 222 connected to the system in accordance with a first embodiment of the present disclosure. FIG. 2b illustrates an application of the control unit 100 wherein the power generated by multiple diesel generators 202, 202a and 202b supplements the power generated by solar panels 212 along with an optional battery bank 222 (represented with dotted lines) connected to the system in accordance with a second embodiment of the present disclosure.

FIGS. 2a and 2b illustrate the use of an inverter 210 which converts the DC power generated by the solar panels 212 to AC power and transfers the same to the loads 208 and is in signal communication 216 with the ACU 100. The communication passed from the inverter 210 to the ACU 100 contains information of the solar power generated by the solar panels 212. A battery bank 222 attached to the system too communicates with the ACU 100. The power line is referenced by the numeral 218. The ACU 100 calculates the Levelized Cost of Energy (LCOE) while operating the different energy sources by in-built algorithm. On the basis of the information of current received from different sources, the ACU 100 controls the power generated by different energy sources in the system.

Inverter 210 is synchronized with grid or diesel generator to supply load. The first switch 214a is in signal communication 216 with the ACU 100. When the grid stops supplying electricity 214a will switch to the diesel generator 202 and the ACU 100 will ensure that there is no backfeeding of power to the diesel generator 202 from the solar panels 212. The power from the diesel generator 202 is directed through a DG Sync Panel 220. The power from the DG Sync Panel 220 and the grid 204 is directed through a distribution panel 206. During peak hours when solar irradiation is maximum, the diesel generator will run on low loading. After reaching a predetermined limit of loading, when solar power is available, the diesel generator will run with the same loading without reducing its loading further. In this situation when excess power is generated in the system in comparison to the load 208 requirements, there is a need to lower the power generation or to store the excess power. In accordance with the second embodiment as illustrated in FIG. 2b, the lowering of the power supplied from the diesel generator 202 is done by switching to lower capacity diesel generators 202a and 202b. In both, the first embodiment and the second embodiment, the excess power is directed towards charging the battery bank 222. An A.C./D.C. converter 224 is connected in the system between two switches 214c and 214d which are in signal communication 216 with the ACU 100.

Figure 2C:
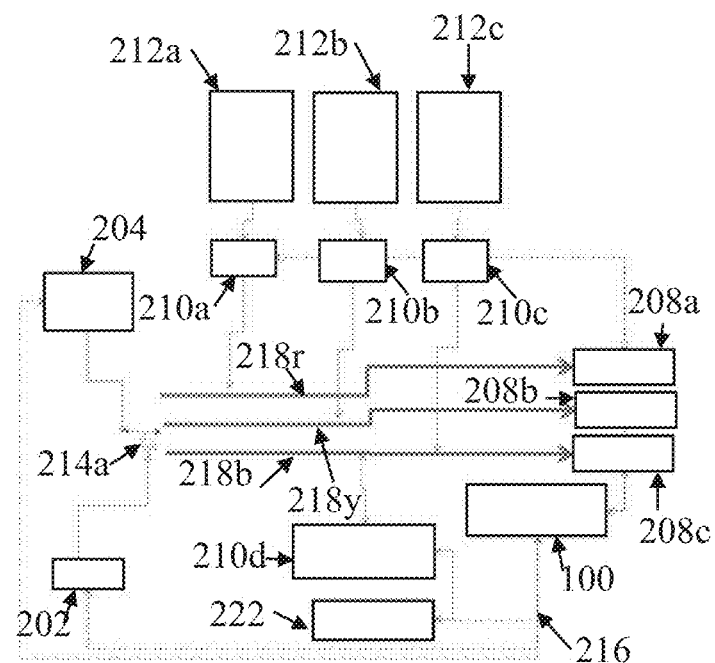
FIG. 2c illustrates an application of the control unit of FIG. 1 wherein the power generated by a diesel generator supplements the power generated by solar panels for a single phase supply in accordance with a third embodiment of the present disclosure.

FIG. 2c illustrates an application of the control unit 100 wherein power generated by a diesel generator 202 supplements the power generated by solar panels 212 for a single phase supply in accordance with a third embodiment of the present disclosure. In accordance with the embodiment multiple solar panels 212a, 212b and 212c are connected to multiple single phase inverters 210a, 210b and 210c which are in turn connected to the single phase loads 208a, 208b and 208c. A bidirectional inverter 210d controls the flow of excess current into the battery bank 222. The grid 204 and the diesel generator 202 are a source of a 415V AC 3-Phase power supply that distribute the power in three single phase AC lines 218r, 218y and 218b to the single phase loads 208a, 208b and 208c.

Figure 3:
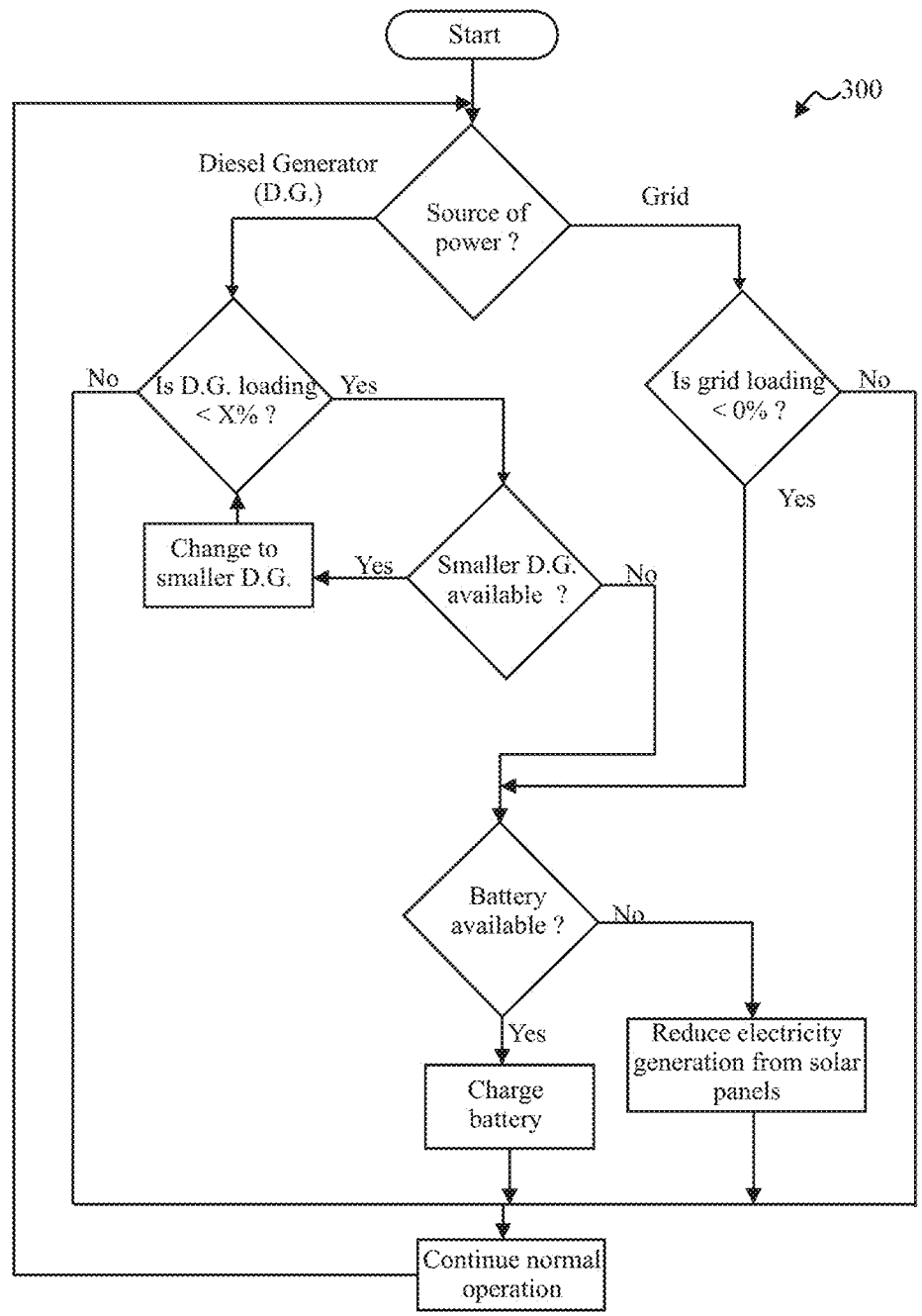
FIG. 3 illustrates a flowchart depicting the working of the control unit of FIG. 1.

The flowchart 300 illustrated in FIG. 3 depicts a decision structure of the ACU 100 used to intelligently and optimally control the power utilization from hybrid energy sources. The primary inputs fed to the ACU 100 include an optimal amount of diesel generator 202 loading and also optimal grid 204 loading. In case the diesel generator 202 with loading falls below the set value, solar power is needed to reduce and thereby adjust the diesel generator loading to a minimum level. The reduced solar power referred to as the excess power is either stored in a battery bank 222, or the power generation from the inverter is throttled at the source to set a minimum loading of diesel generator. Similarly, in case of a grid 204 with the loading falling below 0%, the excess power is for example stored in a battery bank 222. This ensures that the back feed of the current is avoided. In case of unavailability of additional storage batteries or lower loading of diesel generators, the electricity generation from the solar panels is throttled using the inverter 210.

Referring to FIG. 3, a method for controlling power utilization from hybrid energy sources comprises the following steps:

checking the availability of the power grid; including:
- selecting the power grid as the power source if the power grid is available; or
- selecting the diesel generator if the power grid is unavailable;

determining whether loading of the power source is above/below a predetermined value; including:
- determining whether loading of the power source is above/below a set percentage value if the power source is the diesel generator; including:
  - checking whether a lower capacity diesel generator is available if the loading of the diesel generator is below the set value; and
  - switching to the lower capacity diesel generator if available; or
- determining whether loading of the power source is above/below zero percent if the power source is the power grid;

checking whether a battery bank is available for storing excess power, if the lower capacity diesel generator is not available or the loading of the power grid is below zero percent; including:
- charging the battery bank by diverting excess power to the battery bank, if the battery bank is available; or
- reducing excess power transferred from all inverters equally, if the battery bank is not available; and continuing normal operation if loading of the diesel generator is above the set percentage value or loading of the power grid is above zero percent.

The system is able to maximize use of renewable sources of energy by as much as 3 times compared to the consumption of power from grids and generators while also reducing costs. The system also allows for multiple diesel generators synchronization to have optimal fuel consumption. The system also embeds a certain level of automation to allow remote monitoring which saves time and resources. Calculating the LCOE and choosing the cheapest source of energy saves on energy consumption costs for the user. Load shedding can be scheduled as per the time of the day when the user benefits from maximum solar energy. Diesel generator loading can be balanced through sync of single phase in each phase and three-phase inverter.

Some of the application areas of the system include but are not limited to military camps, telecom towers, industries with insufficient grid supply, hotels in remote areas, remote residential areas, islands like Lakshadweep and Andaman, housing societies and schools.

Technical Advancements and Economic Significance

The technical advancements offered by system of the present disclosure include the realization of:

a system which intelligently and optimally controls power utilization from hybrid energy sources which maximizes the use of a renewable source of energy.

a system which intelligently and optimally controls power utilization from hybrid energy sources which reduces energy consumption costs;

a system which intelligently and optimally controls power utilization from hybrid energy sources which requires no human intervention;

a system which intelligently and optimally controls power utilization from hybrid energy sources which prevents back feed of power to the diesel generator and also prevents back feed of power to the power grid if required;

a system which intelligently and optimally controls power utilization from hybrid energy sources which is comparatively less expensive to install and implement;

a system with several operational modes depending on the availability of different energy sources and their power generation capacity.

a system which intelligently and optimally controls power utilization from hybrid energy sources which is vendor agnostic;

a system which intelligently and optimally controls power utilization from hybrid energy sources and can bring the diesel contribution to the load down until 0%;

a system which intelligently and optimally controls power utilization from hybrid energy sources which is applicable to a single phase and three phase power supply;

a system which intelligently and optimally controls power utilization from hybrid energy sources which can be remotely monitored;

a system which intelligently and optimally controls power utilization from hybrid energy sources also allows for multiple diesel generators synchronization to have optimal fuel consumption;

a system which intelligently and optimally controls power utilization from hybrid energy sources that facilitates balanced phase wise loading of various energy sources.

a system which intelligently and optimally controls power utilization from hybrid energy sources that is independent of the capacity of energy sources connected.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values given of various physical parameters, dimensions and quantities are only approximate values and it is envisaged that the values higher or lower than the numerical value assigned to the physical parameters, dimensions and quantities fall within the scope of the disclosure unless there is a statement in the specification to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A system for controlling power utilization from hybrid energy sources, said system comprising:
   a plurality of switches for switching power supply between a plurality of power sources, said power sources being selected from the group consisting of at least one solar panel, at least one diesel generator and a power grid;
   a control unit cooperating with said switches, said power sources and a plurality of loads, said control unit adapted to selectively activate/deactivate said switches to switch between said power sources for supplying power from at least one of said power sources to said loads, wherein the activation/deactivation of each switch is based on a levelized cost of energy (LCOE), the available power from each power source and loading of at least one of said power sources; said control unit further adapted to prevent back-feeding of power between said power sources; and
   an inverter cooperating with said solar panel and said control unit, said inverter adapted to supply power from said solar panel to said loads, said control unit further adapted to control the amount of power being transferred from said inverter to said loads.

2. The system as claimed in claim 1, wherein said control unit comprises:
   at least one processing device adapted to calculate said LCOE;
   a modem adapted to enable said control unit to communicate with an external device;
   a terminal block having a plurality of conductors to connect said control unit to said multiple switches;
   at least one RS485 to USB converter adapted for signal conversion;
   a USB hub adapted to function as a communication port for the control unit;
   at least one miniature circuit breaker (MCB) adapted to prevent overloading of current in said control unit;
   a switch mode power supply (SMPS) adapted to provide power to said control unit;
   a tray adapted to accommodate electric cables associated with said control unit;
   a fan for cooling said control unit and a panel for mounting said control unit thereon.

3. The system as claimed in claim 1, wherein said diesel generator includes at least one low capacity diesel generator; said control unit adapted to activate at least one switch to supply power from said low capacity diesel generator to said loads, in the event that loading of said diesel generator falls below a predetermined value.

4. The system as claimed in claim 1, further comprising a battery bank cooperating with said control unit, said battery bank adapted to store excess power generated by at least one of said power sources; said control unit further adapted to divert the excess power to said battery bank in the event that loading of at least one of said power sources falls below a predetermined value.

5. The system as claimed in claim 1, wherein said inverter is adapted to communicate the amount of solar power generated by said solar panel to said control unit.

6. The system as claimed in claim 1, further comprising a distribution panel cooperating with said power sources and said control unit, said distribution panel adapted to distribute power from said power sources to said loads.

7. The system as claimed in claim 1, further comprising an AC/DC converter cooperating with said battery bank and said control unit, said AC/DC converter adapted to convert power supplied from said battery bank to said loads.

8. The system as claimed in claim 1, further comprising a bidirectional inverter cooperating with said battery bank to control the flow of excess power from said power sources to said battery bank.

9. A method for controlling power utilization from hybrid energy sources comprising at least one solar panel, at least one diesel generator and a power grid, the method comprising the following steps:
   checking the availability of the power grid; including:
      selecting the power grid as the power source if the power grid is available; or
      selecting the diesel generator as the power source if the power grid is unavailable;
   determining whether loading of the power source is above/below a predetermined value; including:
      determining whether loading of the power source is above/below a set percentage value if the power source is the diesel generator; including:
         checking whether a lower capacity diesel generator is available if the loading of the diesel generator is below the set value; and
         switching to the lower capacity diesel generator if available; or
      determining whether loading of the power source is above/below zero percent if the power source is the power grid;
   checking whether a battery bank is available for storing excess power, if the lower capacity diesel generator is not available or the loading of the power grid is below zero percent; including:
      charging the battery bank by diverting excess power to the battery bank, if the battery bank is available; or
      reducing excess power transferred from at least one inverter, if the battery bank is not available; and
   continuing normal operation if loading of the diesel generator is above the set percentage value or loading of the power grid is above zero percent.

* * * * *